United States Patent
Dudar

(10) Patent No.: US 10,371,079 B2
(45) Date of Patent: Aug. 6, 2019

(54) METHOD AND SYSTEM FOR KNOCK SENSOR RATIONALITY CHECK

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 15/261,411

(22) Filed: Sep. 9, 2016

(65) Prior Publication Data

US 2018/0073457 A1    Mar. 15, 2018

(51) Int. Cl.
| | | |
|---|---|---|
| *F02D 35/02* | (2006.01) | |
| *F02D 41/04* | (2006.01) | |
| *F02D 41/22* | (2006.01) | |
| *F02N 11/08* | (2006.01) | |
| *F02P 5/152* | (2006.01) | |

(52) U.S. Cl.
CPC ......... *F02D 41/222* (2013.01); *F02D 35/027* (2013.01); *F02N 11/0814* (2013.01); *F02P 5/1526* (2013.01); *F02D 41/042* (2013.01); *F02D 2200/025* (2013.01); *Y02T 10/40* (2013.01)

(58) Field of Classification Search
CPC .... F02D 41/222; F02D 35/027; F02D 41/042; F02D 2200/025; F02N 11/0814; F02P 5/1526
USPC ........................................ 123/406.16, 406.37
See application file for complete search history.

(56) References Cited

U.S. PATENT DOCUMENTS

| | | | | |
|---|---|---|---|---|
| 4,012,942 A | * | 3/1977 | Harned | F02P 5/152 |
| | | | | 702/56 |
| 4,331,117 A | | 5/1982 | Ginsburgh | |
| 4,373,396 A | * | 2/1983 | Johnson | G01L 9/0022 |
| | | | | 73/35.11 |
| 4,387,588 A | * | 6/1983 | Kaji | G01L 23/225 |
| | | | | 73/35.05 |
| 4,420,967 A | * | 12/1983 | Enoshima | F02P 5/152 |
| | | | | 73/35.05 |
| 4,651,698 A | * | 3/1987 | McDermott | F02P 5/152 |
| | | | | 123/406.35 |
| 4,799,625 A | * | 1/1989 | Weaver, Jr. | A01D 34/62 |
| | | | | 241/101.71 |
| 5,121,729 A | * | 6/1992 | Hashimoto | G01L 23/225 |
| | | | | 123/406.16 |
| 5,665,906 A | * | 9/1997 | Bayer | F02P 17/04 |
| | | | | 123/436 |
| 5,932,801 A | * | 8/1999 | Akishita | G01M 15/12 |
| | | | | 701/111 |

(Continued)

FOREIGN PATENT DOCUMENTS

| | | | | |
|---|---|---|---|---|
| DE | 102008019674 A1 | * | 10/2009 | ........... G01L 23/222 |
| DE | 102008019674 A1 | * | 10/2009 | ........... G01L 23/222 |
| JP | H07324975 A | * | 12/1995 | |

*Primary Examiner* — Sizo B Vilakazi
*Assistant Examiner* — Brian R Kirby
(74) *Attorney, Agent, or Firm* — Julia Voutyras; McCoy Russell LLP

(57) ABSTRACT

Methods and systems are provided for determining engine knock sensor degradation. In one example, a method may include sending an excitation signal to an actuator to generate vibrations in the absence of engine combustion, and determining engine knock sensor degradation by comparing the knock sensor output with the excitation signal.

18 Claims, 3 Drawing Sheets

(56) References Cited

U.S. PATENT DOCUMENTS

| | | | | |
|---|---|---|---|---|
| 6,204,770 B1* | 3/2001 | Johnson | F02D 35/027 | 123/406.16 |
| 6,727,812 B2* | 4/2004 | Sauler | F02D 41/222 | 123/406.16 |
| 6,889,655 B1* | 5/2005 | Demizu | F02P 5/1526 | 123/406.16 |
| 6,997,034 B2* | 2/2006 | Okuda | G01L 23/221 | 73/1.38 |
| 7,021,128 B2* | 4/2006 | Rauchfuss | G01M 15/11 | 73/114.07 |
| 7,088,829 B1 | 8/2006 | Schick et al. | | |
| 7,222,607 B2 | 5/2007 | Hernandez | | |
| 7,546,198 B2* | 6/2009 | Remelman | F02D 35/027 | 123/406.21 |
| 8,078,389 B2* | 12/2011 | Huang | G01M 15/08 | 123/406.23 |
| 8,892,333 B2* | 11/2014 | Fujii | B60L 11/12 | 701/102 |
| 2002/0082754 A1* | 6/2002 | Robichaux | B60L 15/20 | 701/22 |
| 2003/0213281 A1* | 11/2003 | Corral | G01M 7/02 | 73/1.01 |
| 2006/0136117 A1* | 6/2006 | Kaneko | G01L 23/225 | 701/111 |
| 2008/0060861 A1* | 3/2008 | Baur | A63G 25/00 | 180/65.6 |
| 2009/0165746 A1* | 7/2009 | Aso | F02P 5/1523 | 123/406.38 |
| 2010/0018500 A1* | 1/2010 | Itano | F02P 5/152 | 123/406.38 |
| 2010/0212634 A1* | 8/2010 | Yoshihara | F02P 5/152 | 123/406.24 |
| 2011/0093149 A1* | 4/2011 | Tanaka | B60Q 5/008 | 701/22 |
| 2012/0232769 A1 | 9/2012 | Nyu et al. | | |
| 2012/0266844 A1* | 10/2012 | Hagari | F02D 41/1401 | 123/406.38 |
| 2014/0288762 A1* | 9/2014 | Sakayori | F02D 41/123 | 701/31.3 |
| 2014/0350823 A1* | 11/2014 | Glugla | F02P 5/152 | 701/104 |
| 2015/0159573 A1* | 6/2015 | Glugla | F02D 41/1498 | 701/103 |
| 2015/0170629 A1* | 6/2015 | Christoph | G10H 5/00 | 381/61 |
| 2016/0012813 A1* | 1/2016 | Every | G10K 11/175 | 381/66 |
| 2016/0082882 A1* | 3/2016 | Tsuzuki | B60Q 5/008 | 340/425.5 |
| 2016/0223422 A1* | 8/2016 | Bizub | F02B 77/085 | |
| 2016/0231190 A1* | 8/2016 | Bizub | F02D 41/009 | |
| 2016/0245209 A1* | 8/2016 | Bizub | F02D 41/1497 | |

* cited by examiner

METHOD AND SYSTEM FOR KNOCK SENSOR RATIONALITY CHECK

FIELD

The present description relates generally to methods and systems for determining knock sensor degradation and adjusting operation in response thereto.

BACKGROUND/SUMMARY

Engine knock is caused by spontaneous combustion of the air/fuel mixture in compressed end gasses caused by the initial combustion spark event in a combustion chamber. Knock sensors may be employed to identify knock conditions, such as due to carbon buildup inside the combustion chamber. The knock sensor may be a passive piezoelectric device that outputs a voltage in response to the received acoustic vibration. A high amplitude knock sensor output may indicate a knock event. In order to ensure engine performance, a rationality check on the knock sensor may be used.

Attempts to address knock sensor rationality checks include determining knock sensor degradation based on the sensor output during engine operation. One example approach is shown by Hernandez et al. in U.S. Pat. No. 7,222,607 B2. Therein, knock energy of each knock sensor is computed, and a knock sensor fault is determined if the knock energy is lower than an experimentally determined threshold.

However, the inventors herein have recognized potential issues with such systems. As one example, under certain condition, the energy of the knock sensor output may be lower than a threshold even when the knock sensor is working properly. For example, during vehicle idle stop or an electric vehicle (EV) mode of a hybrid electric vehicle (HEV), the knock sensor output may be flat at nearly zero. Under these conditions, prior approaches may lead to false positive diagnosis. Further, rationality checks based on knock energy may be time consuming, since a reliable knock energy calculation may require large sampling points of the knock sensor output.

In one example, the issues described above may be addressed by a method for an engine, comprising: generating a vibration via an actuator in the absence of engine combustion; and indicating knock sensor degradation based on a knock sensor output responsive to the generated vibration. In this way, engine knock sensor degradation may be reliably determined.

As one example, a method may include recording an engine vibration during engine combustion, and generating an excitation signal by adding the recorded engine vibration with a pulse signal. When vehicle is still in operation and the combustion events in all engine cylinders are stopped, an actuator may be actuated with the excitation signal to generate a structural and/or an acoustic vibration. The vibration may simulate the sound or vibrations of engine knock during engine combustion, and trigger a knock sensor (e.g., where processed output of the knock signal would be identified as engine knock by the electronic control system). The vibration, which may include acoustic vibration, may also alert pedestrians and/or vehicle operators that the vehicle is running when there is no engine combustion noise. Based on the knock sensor response, sensor degradation may be indicated. For example, knock sensor degradation may be indicated if amplitude of the knock sensor output corresponding to the excitation pulse signal is lower than a threshold. In this way, a knock sensor rationality check may be reliably performed when there is no combustion event in the engine cylinder (e.g., when the engine is at rest and no combustion cycles are being carried out). Since knock sensor degradation is determined by checking if the sensor is responsive to a controller generated pulse signal in this example, the rationality check may be completed in a short time. In an example, by adjusting the amplitude of the acoustic vibration to within a threshold of the same level as sound generated from engine knock, knock sensor degradation may be determined reliably. Further, by comparing the amplitude of the excitation signal with the amplitude of knock sensor output, degradation in sensitivity of the knock sensor may be compensated. In an example, the actuator for generating the acoustic vibration may be integrated with an acoustic vehicle alerting system (AVAS) that already exists in the HEV. Therefore, the method may be implemented with little adjustment to the vehicle system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
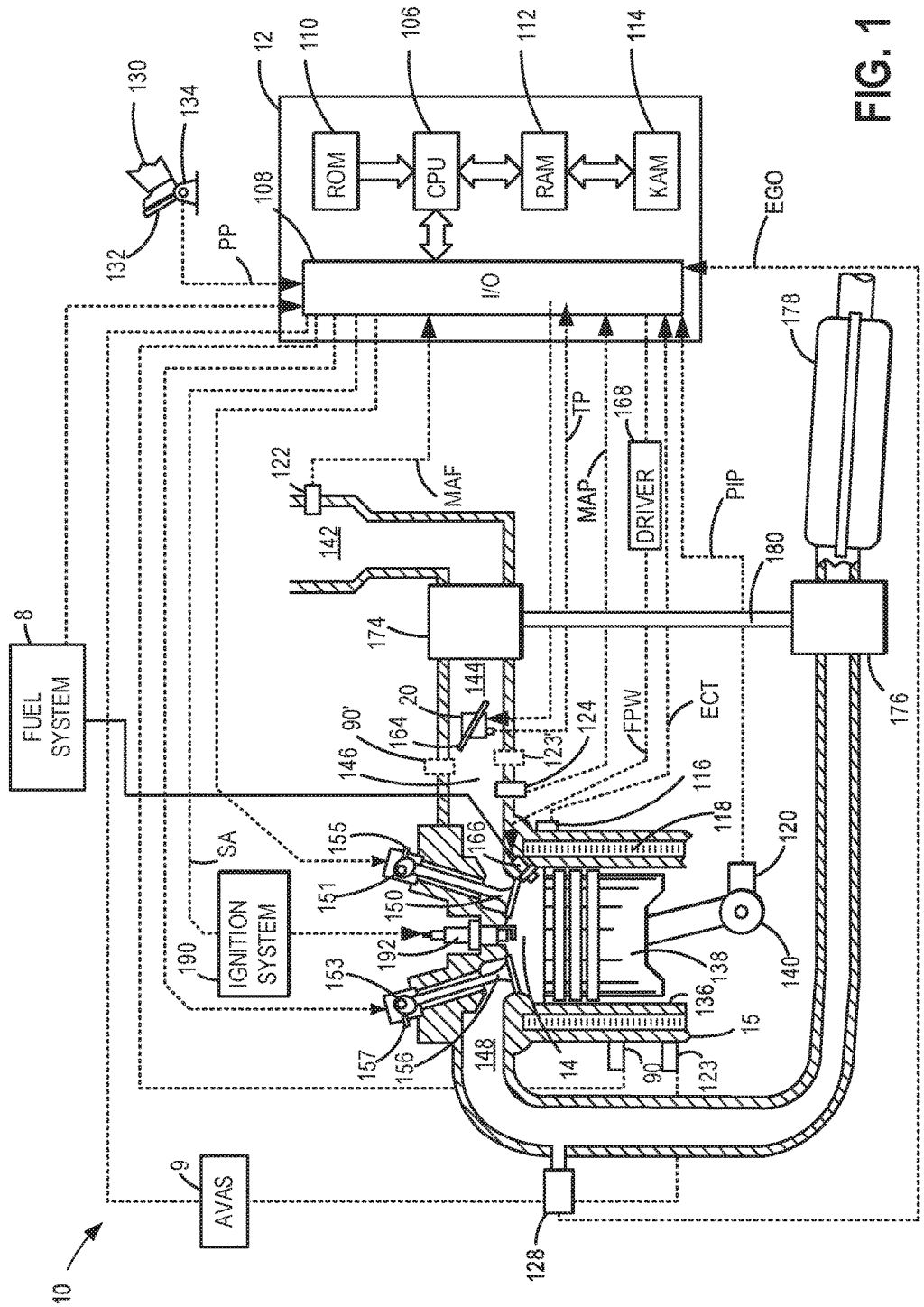
FIG. 1 shows an example engine system.
Figure 2:
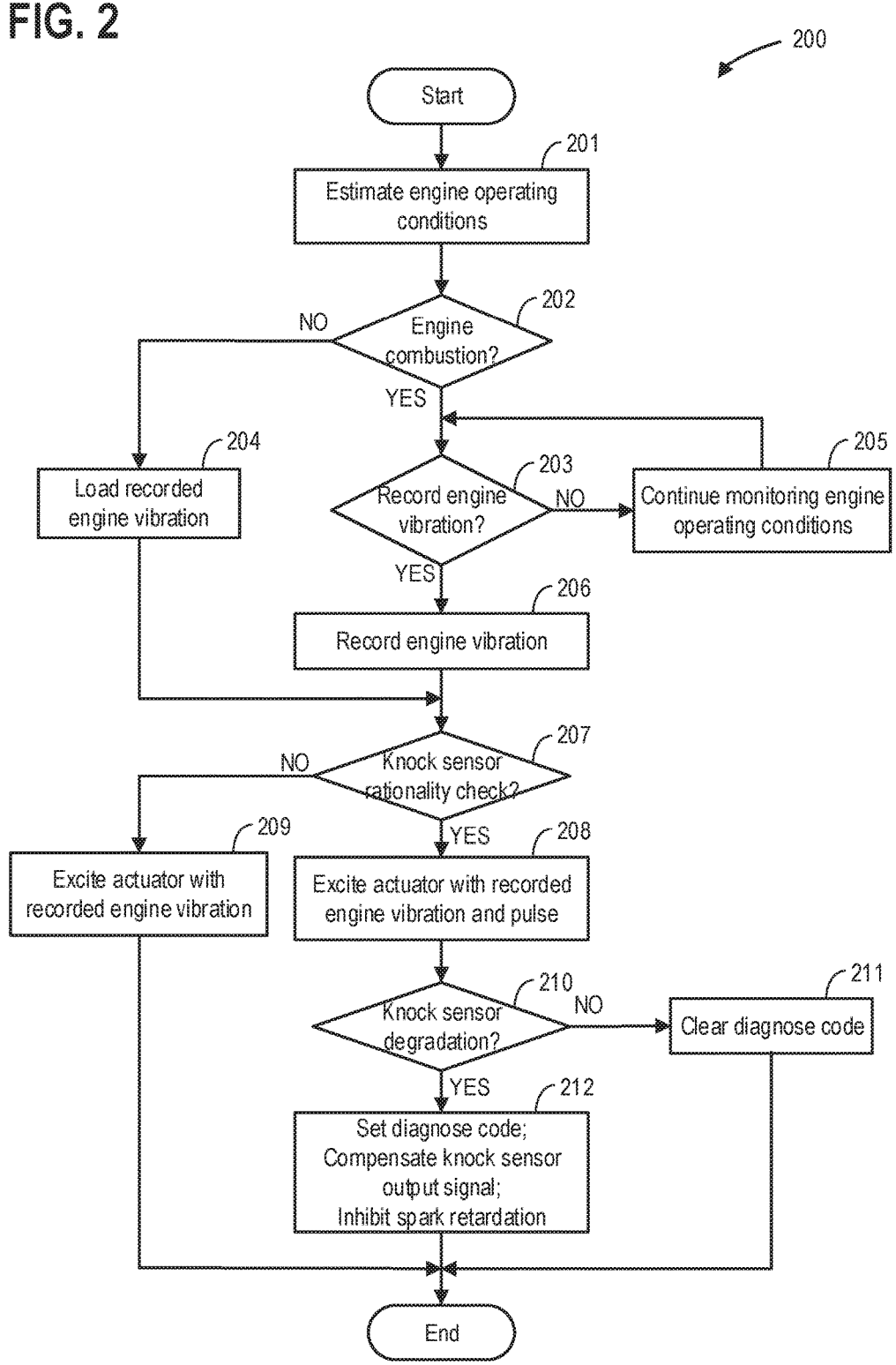
FIG. 2 shows an example method for performing engine knock sensor rationality check.
Figure 3:
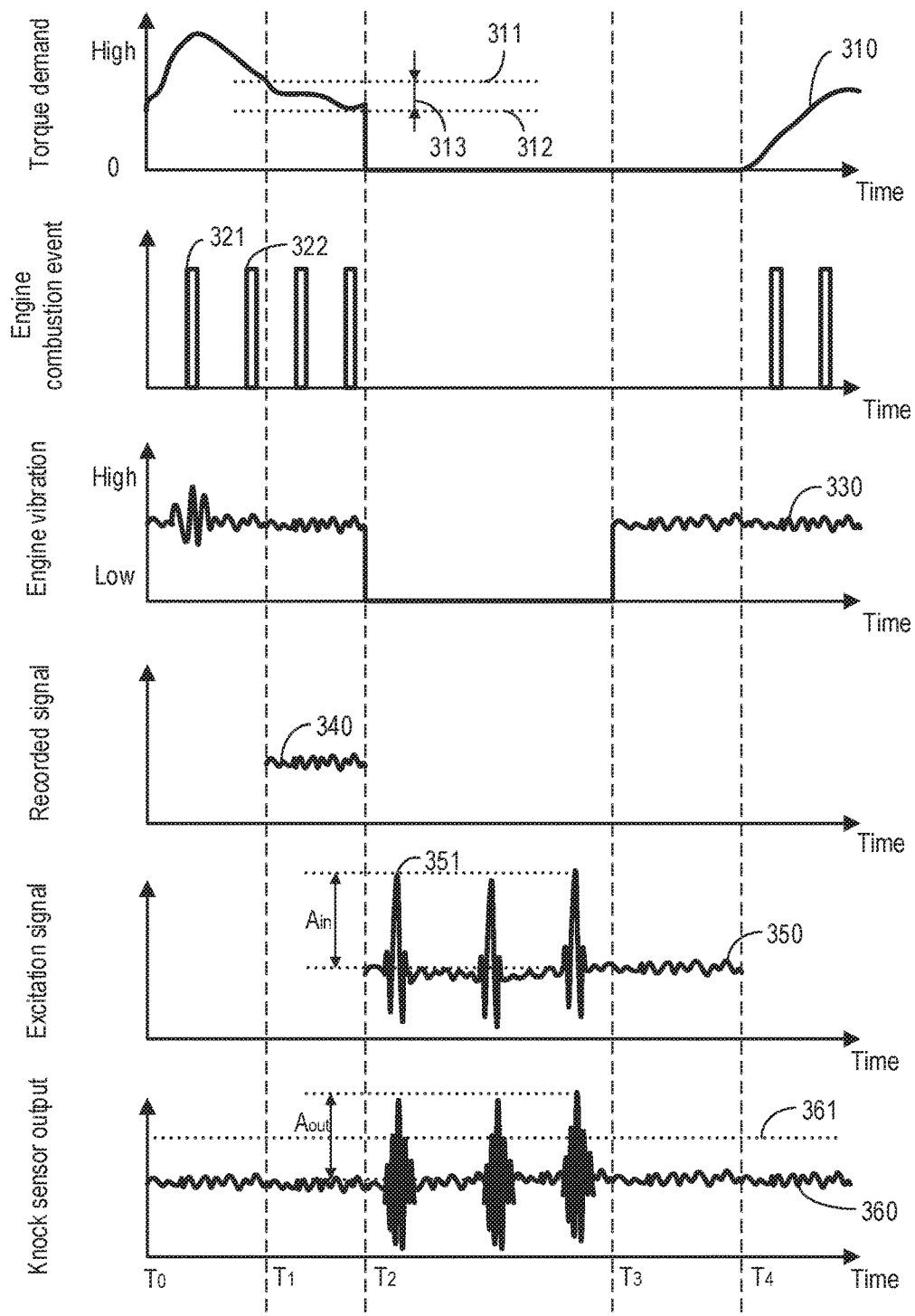
FIG. 3 illustrates timelines of various engine operating parameters while implementing the example method.

The following description relates to systems and methods for performing rationality check of an engine knock sensor in an engine system, such as the engine system shown in FIG. 1. FIG. 2 shows an example method of detecting knock sensor degradation. During engine operation, an actuator is exited to generate a vibration in the absence of engine combustion. If the knock sensor is not sensitive to the vibration, sensor degradation may be determined. Variation in engine operating parameters while implementing the example method is illustrated in FIG. 3.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder 14 (herein also referred to as combustion chamber) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown). Further, a starter motor may be coupled to crankshaft 140 via a flywheel (not shown) to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake air passages 142 and 144, and an exhaust turbine 176 arranged along exhaust passage 148. Compressor 174 may be at least partially powered by exhaust turbine 176 via a shaft 180 where the boosting device is configured as a turbocharger. A wastegate (not shown) may be coupled across exhaust turbine 176 in the turbocharger. Specifically, the wastegate may be included in a bypass passage coupled between an inlet and outlet of the exhaust turbine 176. By adjusting position of the wastegate, an amount of boost provided by the exhaust turbine may be controlled. The wastegate may be coupled to an electromechanical actuator which may receive commands from controller 12. However, in other examples, such as where engine 10 is provided with a supercharger, exhaust turbine 176 may be optionally omitted, where compressor 174 may be powered by mechanical input from a motor or the engine.

A throttle 20 (also termed, intake throttle 20) including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods.

An exhaust gas recirculation (EGR) system (not shown) may be used to route a desired portion of exhaust gas from exhaust passage 148 to intake air passage 142 upstream of compressor 174. An amount of EGR flow may be controlled by an EGR valve. Alternatively, a portion of combustion gases may be retained in the combustion chambers, as internal EGR, by controlling the timing of exhaust and intake valves. In yet another alternative, exhaust gases from upstream of the exhaust turbine may be directed to downstream of the compressor.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows fuel injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, fuel injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel tanks in fuel system 8 may hold fuel with different fuel qualities, such as different fuel compositions. These differences may include different alcohol content, different octane, different heat of vaporizations, different fuel blends, and/or combinations thereof etc.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

Engine 10 may include a knock sensor coupled to each cylinder 14 for identifying abnormal cylinder combustion events, such as those related to knock, low speed pre-ignition (LSPI) and high speed pre-ignition (HSPI). In an embodiment, one or more knock sensors 90 may be coupled to selected locations of cylinder block 15. For example, the knock sensor may be coupled directly to the exterior wall of cylinder block 15. In yet another embodiment, one or more knock sensors 90' may be coupled to the intake manifold 144. For example, the knock sensor may be directly coupled to the wall of the intake manifold, projecting into an interior of the intake manifold.

Engine 10 may further include an acoustic vehicle alerting system (AVAS) 9. Since hybrid electric vehicle are very quiet, AVAS system 9 may actuate an actuator to generate a vibration for alerting pedestrians and/or vehicle operators during vehicle operation. As an example, the AVAS system may be activated and generate acoustic vehicle alerts when the vehicle speed is lower than a threshold and the vehicle engine is deactivated. As another example, the AVAS system may be activated when the vehicle is moving in reverse gear in electric mode. In an example, the actuator for generating the vibration may be a speaker. In one embodiment, actuator 123 may be coupled to cylinder block 15. The actuator may be coupled directly to the exterior wall of cylinder block 15. In another embodiment, actuator 123' may be coupled to intake manifold 144. The actuator may be directly coupled to the wall of the intake manifold, projecting into an interior of the intake manifold. In this way, vibration generated from the actuator may resonate within the cylinder block. In yet another embodiment, the actuator may be positioned outside of all combustion chambers of the engine. In one embodiment, knock sensor 90 and actuator 123 are both coupled to cylinder block. The actuator may generate acoustic vibration simulating the knock sound of the cylinder it coupled to, and the knock sensor may detect engine knock of the cylinder it coupled to. In another embodiment, knock sensor 90' and actuator 123' are both coupled to the intake manifold. The knock sensor may detect engine knock in any cylinder of a multi-cylinder engine. Positioning the knock sensor and the actuator close to each other (both coupled to cylinder block or both coupled to the intake manifold) may ensure that acoustic vibration generated from the actuator may reach the knock sensor. In another embodiment, the knock sensor may be coupled to each cylinder block, and the actuator may be coupled to the intake manifold. By coupling the actuator to the intake manifold, only one actuator is needed for a multi-cylinder engine system for generating the acoustic vibration to determine knock sensor degradation. The acoustic vibration generated by the actuator may simulate engine knock in any cylinder of the multi-cylinder engine. In another embodiment, the knock sensor may be coupled to the intake manifold, and the actuator may be coupled to each of the cylinder block. The AVAS system may further include a recording device for recording engine vibration. In one embodiment, the recording device may be integrated with the actuator. By coupling the actuator to the cylinder block or the intake manifold, engine knock sound may be generated and resonated in the cylinder block or the intake manifold.

As described above, FIG. 1 shows only one cylinder of a multi-cylinder engine. As such each cylinder may similarly include its own set of intake/exhaust valves, fuel injector(s), spark plug, etc.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. The controller 12 thus receives signals from the various sensors of FIG. 1 and employs the various actuators of FIG. 1 to adjust engine operation based on the received signals and instructions stored on a memory of the controller. For example, adjusting amplitude of the generated acoustic vibration may include adjusting actuator 123.

FIG. 2 shows an example method 200 for performing knock sensor rationality check. The method generates a vibration to simulate engine knock sound. If the knock sensor is working properly, a high amplitude knock sensor output may be detected responsive to the vibration. In one embodiment, the actuator may be a part of an AVAS of a HEV.

Instructions for carrying out method 200 and the rest of the methods included herein may be executed by a controller (such as controller 12 in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below.

At step 201, engine operating conditions may be determined by the controller when the vehicle is in operation. The controller acquires measurements from various sensors in the engine system and estimates operating conditions including engine load, engine torque demand, engine speed, engine crankshaft angle, and engine spark timing.

At step 202, method 200 determines whether engine combustion event is stopped. For example, method 200 may determine that engine combustion is stopped if there is no combustion in any of the engine cylinders within their perspective engine cycle. As another example, method 200 may determine that engine combustion is stopped if the park plugs in all cylinders have been disabled. As another example, method 200 may determine that engine combustion is stopped if the engine is under electric vehicle mode, wherein the vehicle is driven only by torque produced from an electric motor. As another example, method 200 may determine that engine combustion is stopped if the engine is stopped (i.e. engine speed is zero). As yet another example, method 200 may determine that engine combustion is stopped if the vehicle is in idle stop. In the absence of combustion event, method 200 moves to step 204, where recorded engine vibration is loaded. For example, the engine vibration may be loaded from a non-transitory memory. The engine vibration may include engine noise due to engine combustion. The engine vibration may also include noise generated by the traveling vehicle. If the engine combustion has not been stopped, method 200 moves to step 203.

At step 203, method 200 determines whether to record engine vibration. As one example, engine vibration may be recorded if there is no recorded engine vibration stored in the non-transitory memory. As another example, the recorded engine vibration may be recorded if the recorded engine vibration has not been updated for a time period.

The controller may also determine whether current engine condition is suitable for recording the engine vibration. In one embodiment, the controller may record engine operation when there is no engine knock. As an example, the controller may record engine vibration when the spark retardation is small and engine knock is unlikely to happen. As another example, the controller may record engine vibration when the engine load is lower than a threshold. In another embodiment, the controller may record engine vibration during steady engine operation. For example, steady engine operation may be determined if the variation of torque demand is within a threshold. In another embodiment, the controller may record engine vibration during low ambient noise. The ambient noise may for example include sound generated unrelated to the operation of the vehicle. In yet another embodiment, the controller may record engine vibration based on road condition. For example, the controller may record engine vibration when the vehicle is traveling on paved road, when noise generated by friction between vehicle wheels and the road is low.

If method 200 determines not to record engine vibration, method 200 moves to step 205, wherein engine operating conditions are continuously being monitored. Otherwise, if method 200 determines to record engine vibration, method 200 moves to step 206.

At step 206, engine vibration may be recorded via a recording device. The engine vibration may include the acoustic vibration generated from engine combustion. The engine vibration may also include sound generated due to engine operation, such as friction among engine components. As one example, the recording device may be a microphone for converting acoustic vibration into a voltage signal. As another example, the recording device may be a piezoelectric device. In one embodiment, the recording device may be positioned in the engine intake manifold. In another embodiment, the recording device may be coupled to the engine block.

At step 207, method 200 determines whether knock sensor rationality check needs to be performed. As an example, knock sensor rationality check may be performed after a predetermined time period. As another example, knock sensor rationality check may be performed if the duration from the most recent rationality check is greater than a threshold. If it is determined not to perform rationality check, method 200 moves to step 209. Otherwise, method 200 moves to step 208.

At step 208, an actuator (such as actuator 123 or 123' in FIG. 1) is actuated with an excitation signal to generate a structural and/or acoustic vibration. In an example, the excitation signal may be a pulse or "ping" signal. In another example, the excitation signal may include the recorded engine vibration from step 206. In one embodiment, controller 12 may generate the excitation signal by adding a pulse signal to the recorded engine vibration signal, and send the excitation signal to the actuator. The actuator may then convert the excitation signal to the vibration. The vibration generated from the pulse signal may simulate engine knock during engine combustion, while the vibration generated from the recorded engine vibration may reproduce vibration during engine operation. In an example, the vibration may be structural vibration. In another example, the actuator may be a speaker, and the vibration is acoustic vibration. In another example, the actuator may alternatively be a piezoelectric device. In one embodiment, the actuator is part of the AVAS system. In another embodiment, the actuator may be positioned in the intake manifold. In another embodiment, the actuator may be coupled to the engine block. In yet another embodiment, the actuator may be integrated with the recording device.

Amplitude of the generated vibration may be adjusted by the controller. In an embodiment, the amplitude of the generated vibration may be tuned to be within a threshold of the same level as sound generated from engine knock. In an embodiment, the amplitude of the generated vibration may be adjusted based on the location of the recording device and the location of the actuator. For example, amplitude of the generated vibration may be increased with an increased distance between the recording device and the actuator. In another embodiment, the amplitude of the generated vibration may be based on the sensitivity of the knock sensor. For example, the amplitude may be increased with decreased knock sensor sensitivity, so that the generated vibration may trigger a response if the knock sensor is healthy.

If method 200 determines not to perform knock sensor rationality check, method 200 moves to step 209, wherein the actuator is excited only with the recorded engine vibration.

At step 210, method 200 monitors knock sensor output and determines knock sensor degradation based on the knock sensor output. In one embodiment, knock sensor degradation may be determined if amplitude of the knock sensor output is lower than a threshold. The threshold may for example decrease with decreased amplitude of the generated acoustic vibration. In another embodiment, the reproduced engine vibration may be first removed from the knock sensor output before comparing to the threshold. As an example, the reproduced engine vibration may be removed by filtering the knock sensor output with a high pass filter. As another example, the reproduced engine vibration may be removed from the knock sensor output by subtracting the recorded engine vibration from the knock sensor output. By removing the reproduced engine vibration from the knock sensor output, signal to noise ratio of the knock output due to the pulse excitation may be increased. If knock sensor degradation is not detected, method 200 moves to step 211 to clear diagnose code related to knock sensor degradation. Otherwise, if knock sensor degradation is determined, method 200 moves to step 212.

At step 212, the diagnose code related to knock sensor degradation may be set and saved in the controller. Further, based on the knock sensor output, a knock sensor compensation factor may be calculated and used to compensate the knock sensor output. For example, the knock sensor compensation factor may be proportional to the amplitude of the excitation pulse, and be proportional to the reciprocal of the amplitude of the knock sensor output responsive to the pulse excitation. The knock sensor compensation factor may reflect the degree of degradation of the knock sensor. For example, increased knock sensor compensation factor indicates decreased sensitivity of the knock sensor. The knock sensor output may be compensated by multiplying the knock sensor output with the knock sensor compensation factor. The compensated knock sensor output may then be analyzed for detecting engine knock. Further, in response to knock sensor degradation, method 200 may inhibit spark retardation to avoid engine knock. For example, method 200 may identify the cylinder that the degraded knock sensor correspond to, and inhibit spark retardation of the identified cylinder.

FIG. 3 shows timelines of engine operating parameters while implementing the method shown in FIG. 2. The x-axes indicate time, and are increased from left to right. The first plot from the top shows torque demand 310. The torque demand increases as indicated by the y-axis. The second plot from the top shows engine combustion event in a representative engine cylinder. The vertical bars (such as 321 and 322) indicate individual combustion event. The third plot from the top shows engine vibration 330. Direction of the y-axis indicates increased engine vibration. The fourth plot from the top shows signal recorded by a recording device. The recorded signal 340 may be a voltage signal. The fifth plot from the top shows excitation signal 350. The excitation signal may be sent to actuate an actuator for generating an acoustic vibration. The excitation signal may be a voltage signal. The sixth plot from the top shows knock sensor output 360. The knock sensor output may be a voltage signal.

From $T_0$ to $T_1$, engine has periodic combustions. The variation in torque demand 310 is high. Consequently, fluctuation in engine vibration is high. During this time period, no signal is recorded, and the actuator is not actuated. Amplitude of the knock sensor output is low, indicating the absence of engine knock.

From $T_1$ to $T_2$, engine combustion continues. Torque demand decreases and is within a range determined by threshold 311 and 312. Since the variation of the torque demand 313 is within a threshold, the controller determines that engine is under steady operation. During steady engine operation, fluctuation in engine vibration 330 decreases comparing to $T_0$-$T_1$. Starting from $T_1$, engine vibration has been recorded and saved in the non-transitory memory of the controller.

At time $T_2$, torque demand drops to zero. The torque demand may drop to zero for example during vehicle idle stop. As another example, torque demand may drop to zero when a HEV is in the EV mode. Engine combustion stops from time $T_2$. Note that though the second plot from the top shows a representative engine cylinder, combustion in each and every engine cylinders has been stopped from $T_2$ to $T_3$. The duration from $T_2$ to $T_3$ is not less than an engine cycle. The excitation signal is a mathematical function of the recorded signal 340 and a pulse (or "ping") signal 351 are sent to the actuator. For example, the excitation signal may be an addition of a scaled recorded engine vibration and a pulse signal. An example excitation signal with periodic high amplitude pulses is plotted in FIG. 3. Alternatively, excitation signal may include a single pulse. In response to each pulse of the excitation signal, knock sensor outputs a high amplitude oscillation. If the amplitude of the oscillation is higher than a threshold 361, the controller determines that the knock sensor passes the rationality check. Otherwise, knock sensor degradation is indicated.

A compensation factor may be determined based on the amplitude of the excitation signal ($A_{in}$) and the amplitude of the knock sensor output ($A_{out}$). For example, compensation factor may be proportional to $A_{in}/A_{out}$. The compensation factor may be multiplied to the knock sensor output to compensate for the sensitivity loss of the knock sensor over time.

In this way, knock sensor degradation can be determined robustly and reliably by exciting it with an acoustic pulse. Technical effect of performing knock sensor rationality check in the absence of engine combustion is that knock sensor degradation may be directly and quickly determined. Technical effect of using an actuator coupled to the intake manifold to excite the knock sensor is that the generated acoustic vibration may simulate the knock sound from any cylinders of the engine system. Technical effect of using an actuator coupled to the cylinder block to excite the knock sensor is that the generated acoustic vibration may simulate the knock sound from the cylinder that the actuator is coupled to. Technical effect of playing recorded engine vibration through the actuator is that pedestrians and vehicle operator may be alerted when noise due to vehicle operation is low. Further, the knock sensor rationality check may be economically performed via an AVAS system with little system modification.

As one embodiment, a method for an engine, comprising: generating a vibration via an actuator in the absence of engine combustion; and indicating knock sensor degradation based on a knock sensor output responsive to the generated vibration. In a first example of the method, wherein the knock sensor degradation is indicated if amplitude of the knock sensor output is lower than a threshold, and where the actuator is positioned outside of all combustion chambers of the engine. A second example of the method optionally includes the first example and further includes, wherein the generated vibration is an acoustic vibration. A third example of the method optionally includes one or more of the first and second examples, and further includes, wherein the actuator is part of an acoustic vehicle alerting system and generates acoustic vehicle alerts responsive to a vehicle speed less than a threshold and the engine deactivated. A fourth example of the method optionally includes one or more of the first through third examples, and further includes, wherein the knock sensor is coupled to an intake manifold. A fifth example of the method optionally includes one or more of the first through fourth examples, and further includes, wherein the knock sensor is coupled to an engine block. A sixth example of the method optionally includes one or more of the first through fifth examples, and further includes, inhibiting spark retardation responsive to an indication of knock sensor degradation. A seventh example of the method optionally includes one or more of the first through sixth examples, and further includes, wherein the actuator is coupled to an engine intake manifold. An eighth example of the method optionally includes one or more of the first through seventh examples, and further includes, wherein the actuator is coupled to an engine block. A ninth example of the method optionally includes one or more of the first through eighth examples, and further includes, recording an engine vibration during engine combustion, and generating a vibration including the recorded engine vibration. A tenth example of the method optionally includes one or more of the first through ninth examples, and further includes, wherein the engine vibration is recorded during steady engine operation.

As another embodiment, a method for an engine, comprising during engine combustion, recording an engine vibration; in the absence of engine combustion, electrically exciting an actuator with an excitation signal, wherein the excitation signal includes the recorded engine vibration and a pulse signal; and indicating knock sensor degradation based on a knock sensor output. In a first example of the method, further comprising recording the engine vibration while the variation of a torque demand is within a threshold. A second example of the method optionally includes the first example and further includes, indicating the knock sensor degradation by comparing the knock sensor output with the excitation signal. A third example of the method optionally includes one or more of the first and second examples, and further includes indicating the knock sensor degradation by filtering the knock sensor output to remove signal responsive to the recorded engine vibration. A fourth example of the method optionally includes one or more of the first through third examples, and further includes, wherein the acoustic pulse signal is a periodic signal.

As yet another embodiment, a vehicle system, comprising: an engine; an actuator coupled to the engine; a knock sensor coupled to the engine; a controller configured with computer readable instructions stored on non-transitory memory for: in the absence of engine combustion, generating an acoustic vibration via the actuator; and indicating degradation of the knock sensor based on output of the knock sensor. In a first example of the system, wherein the acoustic vibration is generated during an engine off state. A second example of the system optionally includes the first example and further includes, wherein the vehicle system is a hybrid electric vehicle, and the acoustic vibration is generated during an electric vehicle mode. A third example of the system optionally includes one or more of the first and second examples, and further includes, wherein the generated acoustic vibration includes a pulse, and the amplitude of the pulse is tuned based on sensitivity of the knock sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
generating a vibration via an actuator in an absence of engine combustion the actuator comprising part of an acoustic vehicle alerting system and generating acoustic vehicle alerts responsive to a vehicle speed less than a threshold and the engine being deactivated; and
indicating knock sensor degradation of a knock sensor based on an amplitude of knock sensor output responsive to the generated vibration.

2. The method of claim 1, wherein the knock sensor degradation is indicated if the amplitude of the knock sensor output is lower than a threshold, and where the actuator is positioned outside of all combustion chambers of the engine.

3. The method of claim 1, wherein the generated vibration is an acoustic vibration.

4. The method of claim 1, wherein the knock sensor is coupled to an intake manifold.

5. The method of claim 1, wherein the knock sensor is coupled to a cylinder block.

6. The method of claim 1, further comprising inhibiting spark retardation responsive to the indication of knock sensor degradation.

7. The method of claim 1, wherein the actuator is coupled to an interior of an engine intake manifold.

8. The method of claim 1, wherein the actuator is coupled to an engine block.

9. The method of claim 1, further comprising recording an engine vibration during engine combustion, and generating the vibration including the recorded engine vibration.

10. The method of claim 9, wherein the engine vibration is recorded during steady engine operation.

11. A method for an engine, comprising:
   during engine combustion without knock, recording an engine vibration of the engine;
   in an absence of combustion in the engine, electrically exciting an actuator coupled to the engine with an excitation signal, wherein the excitation signal includes the recorded engine vibration and a pulse signal simulating knock; and
   indicating knock sensor degradation based on an amplitude of knock sensor output generated in response to the actuator being excited with the excitation signal.

12. The method of claim 11, further comprising recording the engine vibration while a variation of a torque demand is within a threshold.

13. The method of claim 11, further comprising indicating the knock sensor degradation by comparing the amplitude of the knock sensor output with the excitation signal.

14. The method of claim 11, further comprising filtering the knock sensor output and indicating knock sensor degradation based on an amplitude of the filtered knock sensor output.

15. The method of claim 11, wherein the pulse signal is a periodic signal.

16. A hybrid vehicle system, comprising:
   an engine;
   an actuator coupled to the engine;
   a knock sensor coupled to the engine;
   a controller configured with computer readable instructions stored on non-transitory memory for:
   in an absence of engine combustion during an electric vehicle mode where the hybrid vehicle is propelled only by torque generated by an electric motor, generating an acoustic vibration via the actuator;
   and indicating degradation of the knock sensor based on an amplitude of output of the knock sensor.

17. The hybrid vehicle system of claim 16, wherein the acoustic vibration is generated during an engine off state.

18. The hybrid vehicle system of claim 16, wherein the generated acoustic vibration includes a pulse, and an amplitude of the pulse is tuned based on sensitivity of the knock sensor.

* * * * *